April 5, 1960  J. PICKLES  2,931,242
SINGLE MOTOR MULTIPLE DRIVE UNIT
Filed Oct. 17, 1955  3 Sheets-Sheet 1
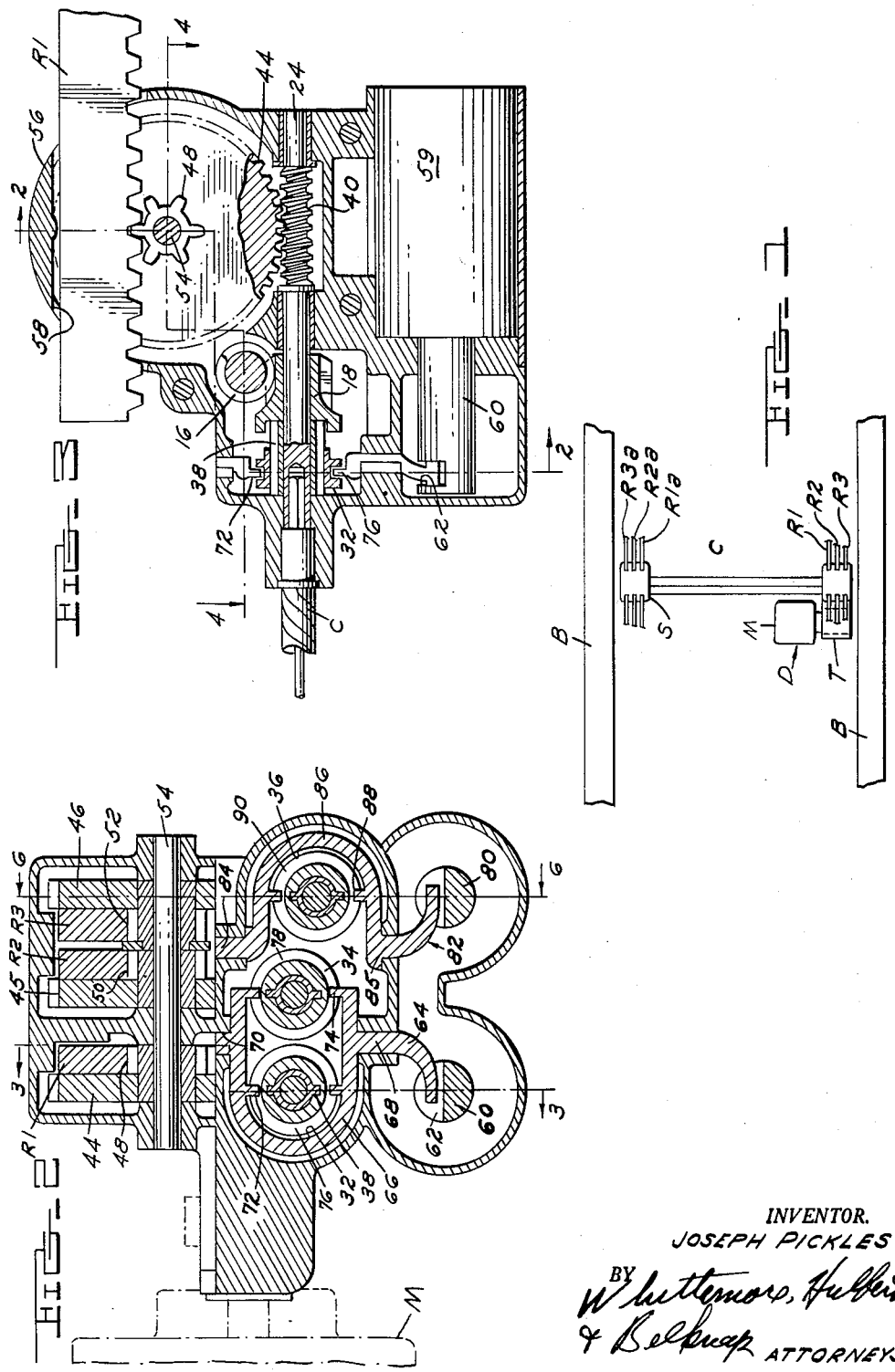
INVENTOR.
JOSEPH PICKLES
BY Wittemore, Hulbert
& Belknap ATTORNEYS

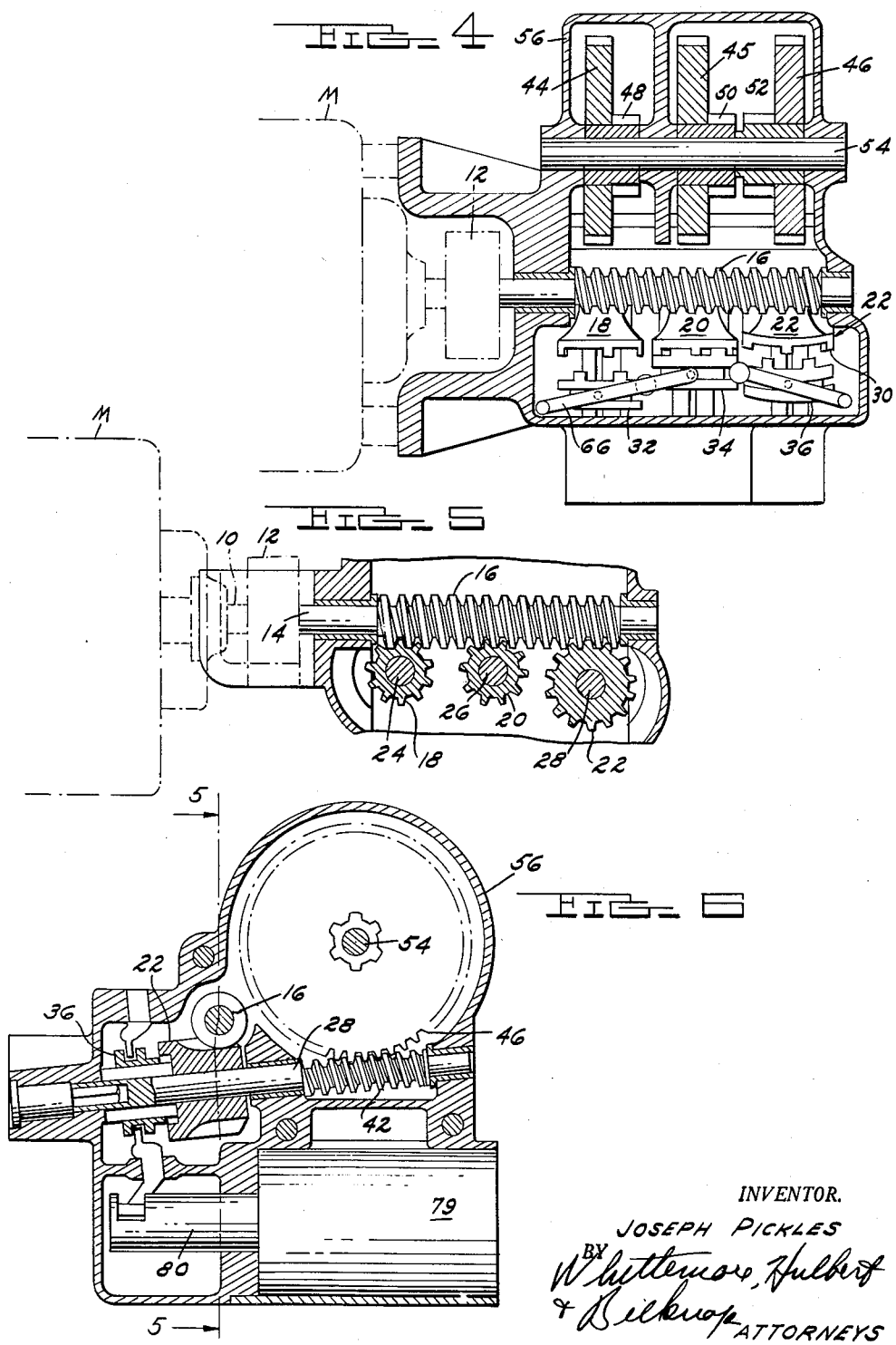

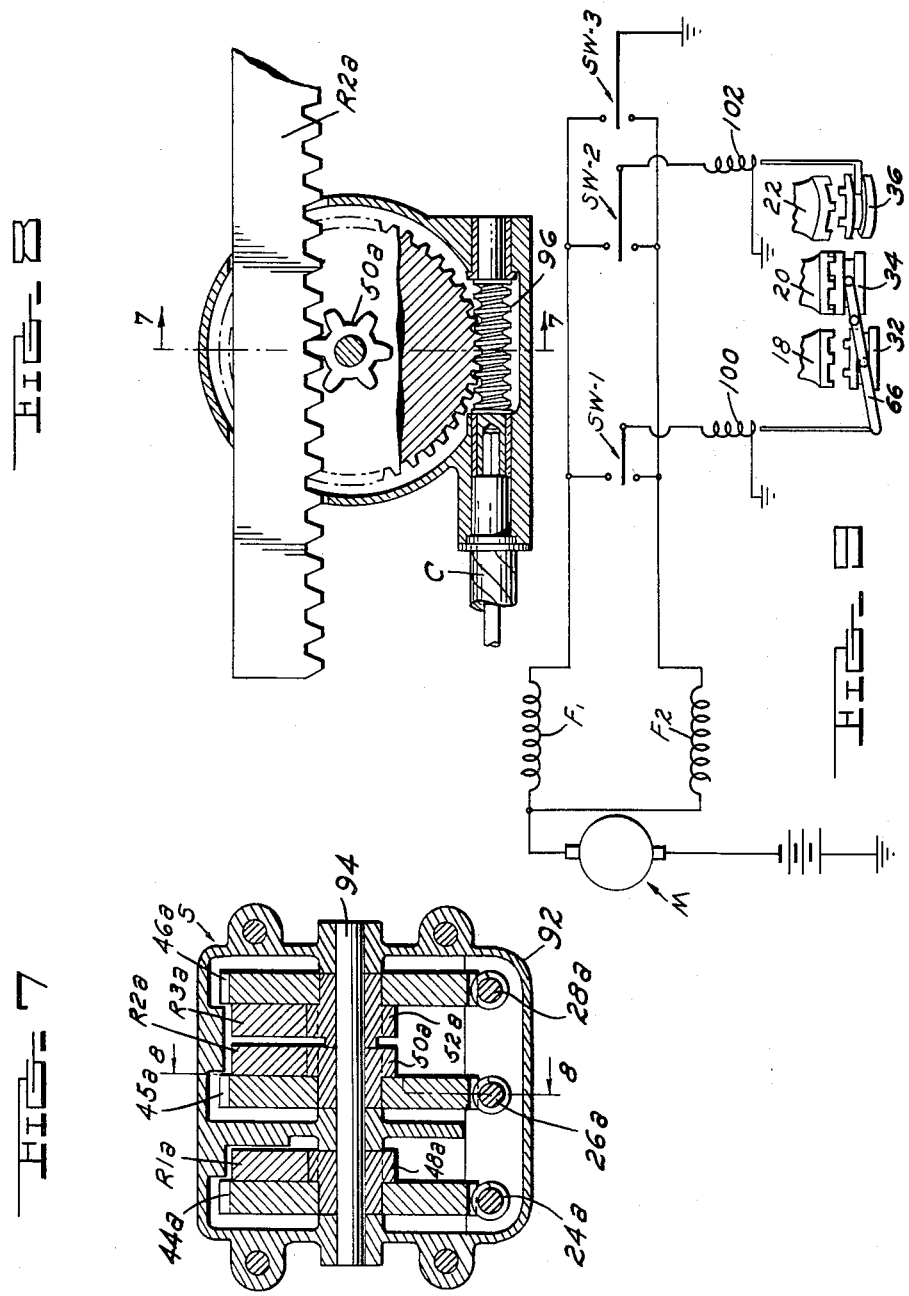

United States Patent Office 2,931,242
Patented Apr. 5, 1960

2,931,242

SINGLE MOTOR MULTIPLE DRIVE UNIT

Joseph Pickles, Dearborn, Mich., assignor to Ferro Stamping Company, Detroit, Mich., a corporation of Michigan Application October 17, 1955, Serial No. 540,917

17 Claims. (Cl. 74—472)

The present invention relates to a single motor multiple drive unit.

The embodiment of the invention illustrated herein is a multiple way seat adjuster but it will be appreciated that the drive unit may be adapted for furnishing power for actuating many other types of devices.

It is an object of the present invention to provide a single motor multiple drive unit comprising a plurality of driven elements in combination with a single reversible electric motor and selectively operable control means for effecting forward or reverse movement of any of said driven elements.

More specifically, it is an object of the present invention to provide a single motor multiple drive unit comprising a reversible motor, a first gear connected to said motor to be driven thereby, a plurality of second gears in constant mesh with said first gear, a plurality of third gears each of which is adapted to be selectively coupled to a corresponding one of said second gears.

It is a further object of the present invention to provide a unit as described in the preceding paragraph in which said motor is a reversible electric motor and in which solenoid operated clutch means are provided for coupling each of said third gears to its associated second gear.

It is a further object of the present invention to provide a unit as described in the foregoing paragraphs in combination with a slave unit comprising a fourth gear adapted to be connected to each of said third gears, and flexible drive means connecting each of said fourth gears to its associated third gear.

It is a further object of the present invention to provide a unit as described in the foregoing in which each of said third gears has associated therewith a driving pinion and a rack in constant mesh with said pinion.

Other objects and features of the invention will become apparent as the description proceeds, especially when taken in conjunction with the accompanying drawings, wherein:

Figure 1 is a diagrammatic view illustrating the relationship of parts of the drive unit and slave unit.

Figure 2 is a sectional view of a master unit, taken on the line 2—2, Figure 3.

Figure 3 is a sectional view on the line 3—3, Figure 2.

Figure 4 is a sectional view on the line 4—4, Figure 3.

Figure 5 is a fragmentary sectional view on the line 5—5, Figure 6.

Figure 6 is a sectional view on the line 6—6, Figure 2.

Figure 7 is a sectional view on the line 7—7, Figure 8.

Figure 8 is a sectional view on the line 8—8, Figure 7.

Figure 9 is a simplified wiring diagram showing the circuits for selective control of the motor and solenoids.

Referring first to Figure 1, the main drive unit is designated at D and comprises a motor M and master unit or transmission means T adapted to effect selective forward or reverse movement of a plurality of racks R1, R2 and R3. A slave unit S is associated with the transmission means T and the transmission means T and the slave unit S include gears which are connected by flexible drive cables C. The slave unit is also provided with racks R1a, R2a and R3a. The arrangement is such that the transmission means and the slave unit contain pairs of racks such as R1 and R1a, R2 and R2a, and R3 and R3a, which are driven synchronously. This arrangement is particularly useful where the invention is applied as mechanism for effecting multiple seat adjustment. In this case it is essential to apply shifting movement to seat supporting rails or bars B at opposite sides of the vehicle which are of identical direction and magnitude so as to avoid binding. At the same time, it is not practical to provide rigid cross connecting shafts or couplings along the floor of the vehicle body since conventionally the floor is provided with a longitudinally upwardly extending hump. In the present case the slave unit is driven in synchronism with the transmission means by the flexible cables C and thus, corresponding racks at opposite sides of the vehicle are driven in synchronism.

Referring now to Figures 2–6 the mechanism is illustrated as comprising a reversible electric motor M having an output shaft 10 connected by a suitable flexible coupling 12 to a shaft 14 carrying a worm 16. In constant mesh with the worm 16 are a plurality of worm gears 18, 20 and 22 which are freely rotatable on shafts 24, 26 and 28 respectively. In order to couple worm gears 18, 20 or 22 selectively with output transmission means the worm gears 18, 20 and 22 are provided with toothed clutch portions designated generally at 30. Slidably mounted on the shafts 24, 26 and 28 are clutch elements 32, 34 and 36 respectively. The clutch elements are prevented from rotating relative to the supporting shafts by virtue of spline connections 38 best illustrated in Figure 2. Accordingly, when clutches 32, 34 or 36 are engaged with the clutch portions 30 of the gears 18, 20 and 22 respectively, the driving connection thus established by the clutch is transmitted to the respective shafts 24, 26 or 28.

Each of the shafts 24, 26 and 28 are provided with or rigidly connected to a second worm, the second worm connected to the shaft 24 being indicated at 40 in Figure 3. The corresponding second worm connected to the shaft 28 is designated 42 in Figure 6. These second worms, two of which are indicated at 40 and 42, are in turn connected to relatively large worm gears. The worm gear in mesh with the worm 40 is indicated at 44 in Figure 3, and the corresponding relatively large worm gear in mesh with the worm 42 is indicated at 46 in Figures 4 and 6. The third relatively large worm gear which is in mesh with a worm carried by the shaft 26 is indicated at 45 in Figure 4.

Rigidly connected to the relatively large worm gears 44, 45 and 46 are relatively small pinions 48, 50 and 52 respectively. The relatively large worm gears 44, 45 and 46 and the pinions 48, 50 and 52 are rotatable on a mounting shaft 54 extending transversely of a generally cylindrical portion 56 of the transmission housing. The housing 56 is provided with openings 58 at opposite sides thereof and the elongated racks R1, R2 and R3, previously referred to, extend through these openings and are provided with teeth in mesh with the pinions. Figure 3 shows the meshing relationship between a rack R1 and the pinion 48 which is rotated on the shaft 54 by its associated worm gear 44.

In order to effect selective control of the movement of the several racks two solenoids are provided. One of the solenoids 59 includes a plunger having an extension 60 having a recess 62 in its forward end in which is receiver a headed actuating arm 64 of a shifter yoke 66. The yoke 66 is pivoted in the transmission housing by axially aligned portions 68 and 70 and includes pairs of fingers 72 and 74 engageable in annular channels 76 and 78 provided in the clutch elements 32 and 34 respectively. The plunger of the solenoid 59 is provided with suitable resilient means such as a spring (not shown) which is effective to move the plunger to one extreme position. When energized the solenoid 59 overcomes the force of the spring and moves to its other extreme position. Accordingly, when the solenoid having the plunger extension 60 is energized clutch element 32 engages the clutch portion of the worm gear 18; when this solenoid is not energized the clutch element 32 is disengaged from the clutch portion of the worm gear 18 and clutch element 34 is engaged with the clutch portion of the worm gear 20. This last position is illustrated in Figure 4.

A similar solenoid 79 having a plunger extension 80 is provided, the extension 80 cooperating with an actuating lever 82 having pivot portion indicated at 84 and 85. The lever 82 includes a yoke portion 86 having inwardly extending pins 88 received in an annular groove 90 of the clutch element 36. The arrangement is such that when the solenoid having the extension 80 is energized, the corresponding clutch element 36 is in engaged relation with the clutch portion 30 of the worm gear 22.

From the foregoing description it will be observed that a driving connection is established from one or more of the racks to the worm 16 which is in turn connected to the motor. These connections are under the selective control of the operator through the clutch elements 32, 34 and 36. In the particular embodiment of the invention illustrated, either the worm gear 18 or 20 is at all times connected to its associated shaft 24 or 26 while the worm gear 22 is independently controlled by a separate solenoid.

Conveniently, the racks R1, R2 and R3 are connected to suitable instrumentalities for effecting adjustment of vehicle seats as for example, means for effecting front to rear adjustment of the seats, means for effecting vertical adjustment of the seats, and means for effecting an independent tilting adjustment of the seats.

In order to assure that these adjustments may take place without binding, it is essential that identical adjustments take place simultaneously at opposite ends of the vehicle seat. For accomplishing this the slave unit S is provided, this unit being illustrated in Figures 7 and 8. The slave unit comprises a housing 92 having a shaft 94 therein. Rotatably mounted on the shaft 94 are worm gears 44a, 45a and 46a corresponding respectively to worm gears 44, 45 and 46 located in the main drive unit. Rigidly connected to the worm gears 44a, 45a and 46a are pinions 48a, 50a and 52a corresponding respectively to the pinions 48, 50 and 52 in the main drive unit. Journaled within the housing 92 of the slave unit are three shafts 24a, 26a and 28a having worm teeth formed thereon as indicated at 96 to mesh respectively with the worm gears 44a, 45a and 46a. The shafts 24a, 26a and 28a are respectively connected by the flexible driving cables C to the shafts 24, 26 and 28 located in the main drive unit housing.

The pinions 48a, 50a and 52a are each in driving mesh with racks R1a, R2a, and R3a. Accordingly, as the respective shafts 24, 26 and 28 are clutched to the worm gears 18, 20 and 22 respectively, a connection is established to the corresponding shaft 24a, 26a or 28a so that corresponding traverse is imparted to the appropriate rack. Moreover, since the driving relation is from a worm to a worm gear in each of the main and slave units, relatively large forces may be effectively transmitted through the flexible cable and applied to the instrumentalities to be driven thereby.

One of the features of the present invention is the fact that selective control of the several racks is exercised by a control circuit including three two-way switches. As a result of this arrangement, energization of one or the other of the solenoids 59 or 79 is effected simultaneously with energization of the motor M in either forward or reverse direction. It is preferred to employ a high torque motor which accelerates to full speed in the shortest possible time. Since engagement of a clutch element comprises a definite though brief time interval, it has been found necessary to provide for substantial lost motion between the teeth of the several clutch elements and the clutch portions of the associated worm gears. This is accomplished by providing relatively narrow teeth and relatively wide tooth spaces in the clutch element in a manner clearly suggested in Figure 4. In practice, approximately 15 to 20 degrees of lost motion is provided. With this amount of lost motion, engagement of the clutch elements with the toothed portions of the associated worm gears is accomplished even though the clutch elements may be rotating at substantial speed when shifted axially into initial contact with the clutch portions of the associated worm gears.

Excellent results have been obtained when the shifter forks connecting the plungers of the solenoids to the axially shiftable clutch elements are formed of plastic such for example as nylon.

A simplified wiring diagram is shown in Figure 9, where the motor M is shown as provided with field winding F1 and F2. Switches Sw1, Sw2, and Sw3 are provided, closure of any one of which to either of its poles will energize the motor either in forward or reverse direction. In addition, closure of switch Sw1 energizes the windings 100 of solenoid 79, while closure of switch Sw2 energizes winding 102 of solenoid 59.

For convenience in distinguishing between similar elements, the worm 16 driven by the motor is referred to as the primary worm, and worm gears 18, 20 and 22 are referred to as primary worm gears. The worms carried by the shafts 24, 26 and 28, two of which are designated 40 and 42, are referred to as secondary or secondary master worms, and worm gears 44, 45 and 46 are referred to as secondary or secondary master worm gears. Worms carried by the shafts 24a, 26a and 28a, and worm gears 44a, 45a and 46a are referred to respectively as secondary slave worms and secondary slave worm gears.

The drawings and the foregoing specification constitute a description of the improved single motor multiple drive unit in such full, clear, concise and exact terms as to enable any person skilled in the art to practice the invention, the scope of which is indicated by the appended claims.

What I claim as my invention is:

1. A single motor multiple drive unit comprising a reversible rotary motor, a primary worm connected to be driven by said motor, a plurality of primary worm gears in constant mesh with said primary worm, a secondary worm for each of said primary worm gears, selectively operable means for coupling each of said primary worm gears to its associated secondary worm, and a secondary worm gear in constant mesh with each of said secondary worms.

2. A single motor multiple drive unit comprising a reversible rotary motor, a primary worm connected to be driven by said motor, a plurality of primary worm gears in constant mesh with said primary worm, a secondary worm for each of said primary worm gears, selectively operable clutch means for coupling each of said primary worm gears to its associated secondary worm, and a secondary worm gear in constant mesh with each of said secondary worms.

3. A single motor multiple drive unit comprising a reversible rotary motor, a primary worm connected to be driven by said motor, a plurality of primary worm gears in constant mesh with said primary worm, a secondary worm for each of said primary worm gears, selectively operable means for coupling each of said primary worm gears to its associated secondary worm, a secondary worm gear in constant mesh with each of said secondary worms, a pinion coupled to each of said secondary worm gears, and a rack in constant mesh with each of said pinions.

4. A single motor multiple drive unit comprising a reversible rotary motor, a primary worm connected to be driven by said motor, a plurality of primary worm gears in constant mesh with said primary worm, a secondary master worm for each of said primary worm gears, selectively operable means for coupling each of said primary worm gears to its associated secondary master worm, a secondary master worm gear in constant mesh with each of said secondary master worms, and a slave unit comprising a plurality of secondary slave worms, flexible drive means coupling each of said secondary slave worms to one of said secondary master worms, said slave unit also comprising a secondary slave worm gear in constant mesh with each of the secondary valve worms therein.

5. A single motor multiple drive unit comprising a reversible electric motor, a first gear connected to be driven in forward and reverse directions by said motor, a plurality of second gears in constant mesh connection with said first gear, a plurality of third gears each adapted to be coupled to one of said second gears to be driven thereby, and selectively operable clutch means for coupling said pairs of second and third gears, said selectively operable clutch means comprising a solenoid operable to couple one of said third gears to its associated second gear and simultaneously to uncouple another of said third gears from its associated second gear.

6. A single motor multiple drive unit comprising a reversible electric motor, a first gear connected to be driven in forward and reverse directions by said motor, three pairs of second and third gears, the three second gears being in constant mesh to be driven by said first gear, the three third gears each adapted to be coupled to the one of said second gears forming a pair therewith, selectively operable clutch means for coupling any of the three third gears with its associated second gear while one of the remaining second and third gears are not coupled, said clutch means comprising a pair of solenoids, clutch actuating means associated with one of said solenoids operable when said solenoid is de-energized to maintain its associated pair of gears uncoupled, the other solenoid having clutch actuating means associated therewith effective to couple one of the two remaining pairs of gears when energized and the other of the two remaining pairs of gears when de-energized.

7. A single motor multiple drive unit comprising a reversible electric motor, a first gear connected to be driven in forward and reverse directions by said motor, three pairs of second and third gears, each of said second gears being in constant mesh to be driven by said first gear, solenoid controlled clutch means selectively operable to couple the second and third gear of each set together, said clutch means comprising two solenoids, a single clutch connected to one of said solenoids, a pair of alternately connected clutches connected to the other solenoid, and switch means for simultaneously energizing said motor in forward or reverse direction and one of said solenoids.

8. A single motor multiple drive unit for selectively driving a plurality of pairs of like members in forward and reverse directions comprising a reversible motor, first gear means connected to said motor, a plurality of second gears in constant mesh connection with said first gear means, a rotary member associated with each of said second gears, selectively operable clutch means for coupling each of said rotary members through its associated second gear to said motor, and separate transmission means comprising at least one flexible rotary drive shaft connecting each of said rotary members to both like members of one of the plurality of pairs of like members.

9. A single motor multiple drive unit comprising a reversible electric motor, a first gear connected to be driven in forward and reverse directions by said motor, a plurality of second gears in constant mesh connection with said first gear, a plurality of driven members each adapted to be coupled to one of said second gears, selectively operable solenoid actuated clutch means for coupling said second gears to the associated driven members, said motor having separate forward and reverse windings, and circuit connections including a plurality of switches for selectively and simultaneously completing a circuit to a selected one of said motor windings and said clutch means.

10. A single motor multiple drive unit comprising a reversible electric motor, a first gear connected to be driven in forward and reverse directions by said motor, a plurality of second gears in constant mesh connection with said first gear, a plurality of driven members each adapted to be coupled to one of said second gears, a plurality of separately and selectively operable solenoid actuated clutch means for coupling said second gears to the associated driven members, said motor having separate forward and reverse windings, and circuit connections including a plurality of switches for selectively and simultaneously completing a circuit to a selected one of said motor windings and a selected one of said clutch means.

11. A single motor multiple drive unit comprising a reversible electric motor, a first worm connected to be driven in forward and reverse directions by said motor, a plurality of first worm gears in constant mesh with said first worm, a plurality of second worms each adapted to be coupled to one of said first worm gears to be driven thereby, selectively operable clutch means for coupling each of said second worms to one of said first worm gears, a second worm gear in constant mesh with each of said second worms, a pinion connected to each of said second worm gears, and a rack in mesh with each of said pinions.

12. A single motor multiple drive unit for selectively driving any one of a plurality of driven members in forward and reverse direction independently of an other of said driven members comprising a reversible electric motor drive means having separate forward and reverse windings, a first gear connected to said drive means, a plurality of second gears in constant mesh connection with said first gear, transmission means connecting each of said driven members to one of said second gears, said transmission means including selectively energizable solenoid clutches, and switch means for effecting selective energization of said forward or reverse motor windings and simultaneous energization of a selected one of said solenoid clutches.

13. A single motor multiple drive unit for selectively driving any one of a plurality of driven members in forward and reverse direction independently of another of said driven members comprising a reversible electric motor drive means having separate forward and reverse windings, a first gear connected to said drive means, a plurality of second gears in constant mesh connection with said first gear, transmission means connecting each of said driven members to one of said second gears, said transmission means including at least one flexible drive cable and selectively energizable solenoid clutches, and switch means for effecting selective energization of one of said forward or reverse motor windings and simultaneous energization of a selected one of said solenoid clutches.

14. A single motor multiple drive unit for selectively driving a plurality of pairs of like members in forward and reverse directions comprising a reversible motor, a first gear connected to said motor, a plurality of second gears in constant mesh connection with said first gear, a rotary member associated with each of said second gears, selectively operable clutch means for coupling each of said second gears to its associated rotary member, and separate transmission means comprising at least one flexible rotary drive shaft connecting each of said rotary members to both the like members of one of the plurality of pairs of like members, said transmission means comprising pinions, and racks in mesh with said pinions and connected to the paired like members.

15. A single motor multiple drive unit for selectively driving in forward and reverse directions a plurality of pairs of like seat adjusting devices at opposite ends of the seat of a motor vehicle comprising a reversible electric motor, a first gear connected to be driven in forward and reverse directions by said motor, a plurality of second gears in constant mesh connection with said first gear, a plurality of rotatable members each adapted to be coupled to one of said second gears, selectively operable solenoid clutch means for coupling said second gears to the associated driven members, separate transmission means for connecting each of said rotatable members to both of the seat adjusting devices of a pair thereof, said motor having forward and reverse windings, and circuit connections including a plurality of switches for selectively and simultaneously completing a circuit to a selected one of said windings and to said solenoid actuated clutch means.

16. A unit as defined in claim 15 in which said transmission means includes at least one flexible rotary drive shaft.

17. A single motor multiple drive unit for selectively driving in forward and reverse directions any one of a plurality of different remotely positioned devices each including rotary actuating means, said unit comprising a reversible electric motor, rotary drive gear means connected to be driven in forward and reverse direction by said motor, a separate transmission including said drive gear means connecting said motor to each of said actuating means, said transmissions each including a separate gear in mesh with said drive gear means and a selectively operable solenoid clutch operable to complete or interrupt the transmission, said motor having forward and reverse windings, and circuit connections including a plurality of switches for selectively and simultaneously completing a circuit to a selected one of said motor windings and to a selected one of said solenoid clutches.

References Cited in the file of this patent
UNITED STATES PATENTS

| | | |
|---|---|---|
| 1,251,418 | Reinschmidt | Dec. 25, 1917 |
| 2,201,118 | Beede | May 14, 1940 |

FOREIGN PATENTS

| | | |
|---|---|---|
| 882,504 | Germany | July 9, 1953 |